Patented Dec. 3, 1929

1,737,639

UNITED STATES PATENT OFFICE

CLIFFORD D. CARPENTER, OF NEW YORK, N. Y.

METHOD OF MAKING ARSENATES

No Drawing.    Application filed April 30, 1924.   Serial No. 710,160.

This invention relates to methods of making arsenates, and more particularly to methods of making calcium arsenate.

At the present time, it is the usual practice to prepare calcium arsenate by treating arsenic trioxide with nitric acid to form arsenic acid, carrying a small amount of nitric acid and a trace of arsenious acid. This product is then treated with milk of lime and the resulting calcium arsenate filtered off and dried.

An object of the present invention is to provide a method of producing calcium arsenate in which sodium nitrate is employed as the oxidizing agent.

A further object is to provide a method of producing calcium arsenate in which arsenic trioxide is treated with sodium nitrate in an alkaline medium, preferably at a fusion temperature.

In practicing the process, arsenic trioxide and sodium nitrate are mixed, in the presence of caustic soda, and brought to the fusing temperature, approximately 350° C., and kept at that temperature until sodium arsenite formed from the caustic soda and arsenic trioxide, has been oxidized by the sodium nitrate to form sodium arsenate. The completion of the process will be indicated by the cessation of the evolution of nitric oxide gas. The oxides of nitrogen formed during the process are carried off and may be recovered as nitric acid by mixing them with air and absorbing in water. The process usually requires about two hours.

The fusion mass is then dissolved in water, preferably by running the fused mass while still fused together with any undissolved sodium arsenate into a vessel of cold water and the resulting water solution treated with milk of lime to precipitate calcium arsenate. the calcium arsenate is filtered off, washed, dried, ground, and packed for shipment. The filtrate obtained consists of the caustic soda solution together with some unchanged sodium nitrate and upon evaporation, will give a mixture of caustic soda and sodium nitrate which may again be used in practicing the process.

The first step of the process in which sodium arsenate is formed takes place in approximate accordance with the following equation:

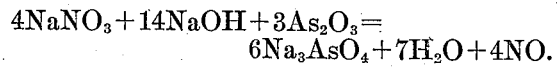
$$4NaNO_3 + 14NaOH + 3As_2O_3 = 6Na_3AsO_4 + 7H_2O + 4NO.$$

During the process, a small amount of nitrogen dioxide gas is set free. In carrying out the process in a commercial way, it is desirable to use an excess of sodium nitrate and an excess of caustic soda. If the sodium nitrate be used in too large a quantity, however, the efficiency of the oxidation by the sodium nitrate decreases as considerable amounts of nitrogen dioxide will be produced instead of nitric oxide.

In a typical embodiment of the invention, a mixture of 700 pounds of caustic soda, 200 pounds of arsenic trioxide, and 165 pounds of sodium nitrate are heated for a period of about two hours, to a temperature of approximately 350° C. in an iron kettle. The temperature is maintained until the sodium arsenite formed from the caustic soda and arsenic trioxide has been oxidized by the sodium nitrate to form sodium arsenate. As stated, the fusion is completed when nitric oxide gas is no longer given off. The fused mass together with any suspended sodium arsenate is then dissolved in water, the amount of water varying considerably, but an amount which will give a total soluble content of from 10 per cent to 15 per cent has been found to be a convenient amount.

This solution is then treated with milk of lime to precipitate calcium arsenate. The calcium arsenate is filtered off, washed, dried, and ground. The filtrate is then evaporated to obtain a mixture of sodium nitrate and caustic soda which may be strengthened by the addition of more sodium nitrate and again used in the process.

While the use of caustic soda is desirable from a practical standpoint, it is not essential and the process may be performed by heating the mixture of arsenic trioxide and sodium nitrate in the proportions set forth above. When the materials are mixed in the proper proportions, the reaction for the formation of sodium arsenate goes to practical completion and the resulting calcium arsenate obtained contains even less arsenious acid or its salts than most of the calcium arsenate sold commercially.

If desired, the process may be carried on in concentrated aqueous solutions, preferably under pressure in order that the concentrations of the materials may be raised, but this reduces the speed of the reaction and as a general rule is not as preferable as the form of the process disclosed above. For this purpose a pressure of 250 pounds per square inch may be employed.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

I claim:

1. The process of making sodium arsenate which comprises treating an oxygen-containing compound of arsenic in which the oxygen is present in the lower proportion of the proportions with which it combines with arsenic, with an alkali metal salt of an inorganic acid containing a nitrogen-oxygen radical at a temperature above 150° C.

2. The process of making sodium arsenate which comprises treating an oxygen-containing compound of arsenic in which the oxygen is present in the lower proportion of the proportions with which it combines with arsenic, with an alkali metal salt of an inorganic acid containing a nitrogen-oxygen radical at a temperature above 150° C. in the presence of an excess of fused caustic soda.

3. The process of making sodium arsenate which comprises treating an oxygen-containing compound of arsenic in which the oxygen is present in the lower proportion of the proportions with which it combines with arsenic, with sodium nitrate at a temperature above 150° C.

4. The process of making sodium arsenate which comprises treating an oxygen-containing compound of arsenic in which the oxygen is present in the lower proportion of the proportions with which it combines with arsenic, with sodium nitrate at a temperature above 150° C. in the presence of an excess of fused caustic soda.

5. The process of producing sodium arsenate which comprises treating sodium arsenite with an alkali metal salt of an inorganic acid containing a nitrogen-oxygen radical in the presence of an excess of fused caustic soda at a temperature in excess of 150° C.

6. The method of producing sodium arsenate which comprises oxidizing sodium arsenite in the presence of an excess of fused caustic soda at a temperature above 150° C.

7. The method of producing sodium arsenate which comprises treating sodium arsenite with an alkali metal nitrate in the presence of an excess of fused caustic soda at a temperature above 150° C.

8. The method of producing sodium arsenate which comprises treating sodium arsenite with sodium nitrate in the presence of an excess of fused caustic soda at a temperature above 150° C.

9. The process of making sodium arsenate which comprises fusing sodium arsenite with a sodium salt of an inorganic acid having a nitrogen-oxygen radical.

10. The process of making sodium arsenate which comprises fusing sodium arsenite with sodium nitrate.

In testimony whereof, I affix my signature.

CLIFFORD D. CARPENTER.